(12) United States Patent
Schulz

(10) Patent No.: US 6,636,074 B2
(45) Date of Patent: Oct. 21, 2003

(54) CLOCK GATING TO REDUCE POWER CONSUMPTION OF CONTROL AND STATUS REGISTERS

(75) Inventor: Jurgen M. Schulz, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/054,811

(22) Filed: Jan. 22, 2002

(65) Prior Publication Data

US 2003/0141901 A1 Jul. 31, 2003

(51) Int. Cl.[7] .................... H03K 19/00; H03L 7/00
(52) U.S. Cl. .................... 326/93; 326/136; 327/141
(58) Field of Search ........................ 326/93, 101, 21, 326/136; 327/544, 141, 144

(56) References Cited

U.S. PATENT DOCUMENTS

| | | | |
|---|---|---|---|
| 5,834,961 A | * 11/1998 | Hillan et al. ............... 327/295 |
| 5,983,301 A | 11/1999 | Baker et al. | |
| RE36,839 E | 8/2000 | Simmons et al. | |
| 6,188,641 B1 | * 2/2001 | Uchida ........................ 365/233 |
| 6,202,163 B1 | 3/2001 | Gabzdyl et al. | |
| 6,202,166 B1 | 3/2001 | Tang | |
| 6,205,192 B1 | 3/2001 | Igura | |
| 6,232,820 B1 | 5/2001 | Long et al. | |
| 6,247,134 B1 | 6/2001 | Sproch et al. | |
| 6,275,081 B1 | * 8/2001 | Flake ........................ 327/202 |
| 6,308,313 B1 | 10/2001 | Lakshminarayana et al. | |

FOREIGN PATENT DOCUMENTS

| | | | |
|---|---|---|---|
| EP | 786 727 | 7/1997 | |
| JP | 02039559 A | * 2/1990 | ........... H01L/27/04 |

OTHER PUBLICATIONS

"The CoreConnect™ Bus Architecture," International Business Machines Corp., XP-002204519, 1999, pp. 1–9.
"Figure Fight," Nick Flaherty, Electronics Times, Jul. 16, 2001, 4 pages.

* cited by examiner

Primary Examiner—Michael Tokar
Assistant Examiner—James Cho
(74) Attorney, Agent, or Firm—Meyertons Hood Kivlin Kowert & Goetzel, P.C.; B. Noël Kivlin

(57) ABSTRACT

Various systems and methods for reducing the power consumption of CSRs (Control and Status Registers) within an integrated circuit (IC) are disclosed. In one embodiment, an IC includes a plurality of CSRs. Each CSR includes one or more flip-flops that are used to store one or more bits of control and/or status information for an associated device on the IC. The IC also includes one or more clock gates. Each clock gate is coupled to provide a gated clock signal to one or more of the flip-flops in a respective one of the CSRs. Each clock gate is configured to output a clock signal as the gated clock signal if a clock enable signal that corresponds to the respective CSR is asserted. The IC also includes one or more clock gating units that are each configured to generate the clock enable signal for a respective one of the CSRs.

9 Claims, 5 Drawing Sheets

CLOCK GATING TO REDUCE POWER CONSUMPTION OF CONTROL AND STATUS REGISTERS

BACKGROUND OF THE INVENTION

1. Field of the Invention

This invention relates to integrated circuits and, more particularly, to control and status registers (CSRs) included in integrated circuits.

2. Description of the Related Art

A typical computer system includes a central processing unit (CPU) coupled to one or more peripheral devices (e.g., disk drives and printers). The CPU typically monitors and controls the peripheral devices via addressable control and status registers (CSRs) within the devices. For example, in order to determine the state of a peripheral device, the CPU may read a status value from an address of a status register within the device. In order to configure or control functions of the device, the CPU may write a control value to an address assigned to a control register within the device. It is noted that the CPU itself may include CSRs and may be monitored and controlled via the CSRs.

The CSRs of a device are typically formed with other device logic upon a single integrated circuit (IC). As IC fabrication technology has improved, the ability to integrate more and more functions onto single silicon substrates has increased. As a result, the number of functions performed by devices has also increased. In turn, the number of CSRs within the devices has necessarily increased. In fact, some devices now include hundreds of CSRs. It is also noted that shrinking IC device geometries have also allowed operating speeds of devices to increase.

Given the number of CSRs that may be present on a given IC, a significant amount of power may be consumed by the CSRs. As operating speeds increase, power consumption also tends to increase. Consequentially, it is desirable to be able to reduce the power consumed by the CSRs on a given IC.

Typical power saving techniques tend to focus control the IC as a whole or control large numbers of devices within the IC. For example, one way to reduce power consumption is to turn off the IC or reduce the operating speed of the IC during times when the IC is not being used or is not experiencing heavy demand. However, since these techniques apply to the IC as a whole, they may miss opportunities to reduce the power consumption of individual devices within the IC. Consequentially, it is desirable to reduce the power consumed by individual CSRs within an IC, even when the rest of the IC is not turned off or operating at a reduced speed.

SUMMARY

Various embodiments of systems and methods for reducing the power consumption of CSRs (Control and Status Registers) within an integrated circuit (IC) are disclosed. In one embodiment, an integrated circuit includes a plurality of CSRs. Each CSR includes one or more flip-flops that are used to store one or more bits of control and/or status information for an associated device on the IC. The IC also includes one or more clock gates. Each clock gate is coupled to provide a gated clock signal to one or more of the flip-flops in a respective one of the CSRs. Each clock gate is configured to output a clock signal as the gated clock signal if a clock enable signal that corresponds to the respective CSR is asserted. The IC also includes one or more clock gating units. Each clock gating unit is configured to generate the clock enable signal for a respective one of the CSRs. For example, a first clock gating unit is configured to assert the clock enable signal for a first one of the CSRs in response to detecting a software update to the first CSR.

In one embodiment, each clock gate may be integrated into a respective flip-flop. Accordingly, each flip-flop may have a clock enable input and a clock signal input. The first controller may detect a software update to the first CSR by detecting an indication (e.g., a destination address equal to the address of the first CSR) that the first CSR is the destination of a write command. In some embodiments, some of the controllers may be configured to assert the clock enable signal for a respective CSR in response to detecting a hardware update to that CSR.

In some embodiments, a method of reducing power consumption of an integrated circuit comprising a plurality of CSRs may involve deasserting a first clock enable signal associated with a first CSR and deasserting a second clock enable signal to a second CSR. When their respective clock enable signals are deasserted, the first and second CSRs may consume a reduced amount of power. However, the first and second CSRs may not be able to be updated while their respective clock enable signals are deasserted. Thus, the method may also involve subsequently detecting a software update to the first CSR and, in response, asserting the first clock enable signal associated with the first CSR. In response to asserting the clock enable signal, a clock signal may be provided to the first CSR so that the software update can occur. The first clock enable signal is asserted independently of the second clock enable signal.

In another embodiment, an IC includes a plurality of means for storing control and status information, where each of the means for storing control and status information cannot be updated unless a respective clock enable signal is asserted. The IC may also include one or more means for detecting a software update to a respective one of the means for storing control and status information. Each means for detecting the software update controls the respective clock enable signal for the respective one of the means for storing control and status information. Each means for detecting the software update asserts the respective clock enable signal in response to detecting a software update to the respective one of the means for storing control and status information.

BRIEF DESCRIPTION OF THE DRAWINGS

A better understanding of the present invention can be obtained when the following detailed description is considered in conjunction with the following drawings, in which.

Figure 1:
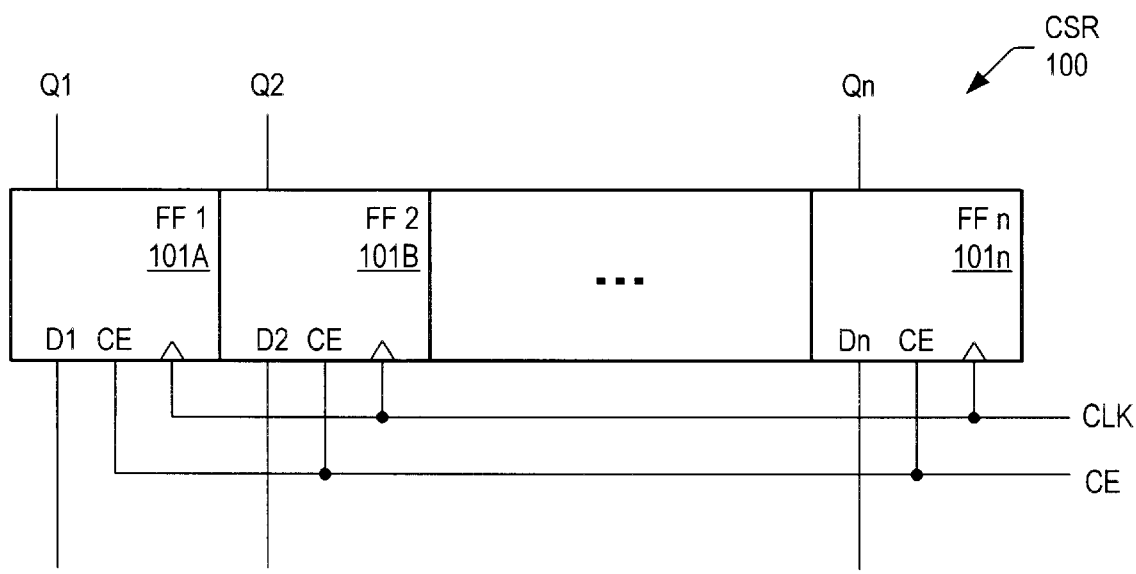
FIG. 1 illustrates one embodiment of a CSR.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

CSR

FIG. 1 shows one embodiment of a CSR 100. Generally, a given CSR may include from one to n flip-flops. In this embodiment, each flip-flop 101 A-101 in (collectively referred to as flip-flops 101) within CSR 100 includes a clock input, a clock enable input CE, and a data input D. Flip-flops 101 are D flip-flops in this embodiment. D flip-flops accept an input D and output the input value as Q one clock later. The CSR shown in FIG. 1 may be used to store one to n bits of control and/or status information for a device implemented on an integrated circuit (IC) (not shown). Note that other embodiments of CSR 100 may include other types of flip-flops (e.g., flip-flops configured as scan flip-flops or flip-flops such as S-R, J-K, or T flip-flops). A CSR like the one shown in FIG. 1 may be implemented using various types of logic (e.g., ECL (Emitter-Coupled Logic), CMOS (Complementary Metal Oxide Semiconductor), TTL (Transistor-Transistor Logic), etc.).

Flip-flops 101 are each configured to output the value present at their respective D inputs in response to a change (e.g., from high to low, low to high, or both) in the clock signal. Each time a clock signal is received and the clock enable CE signal is asserted, one or more components (e.g., capacitors or transistors) within each flip-flop 101 consume power, even if the overall state of that flip-flop does not change.

The clock enable input is configured to prevent the flip-flop from being clocked when the clock enable signal CE is not asserted (e.g., when CE is low in positive logic or when CE is high in negative logic). Thus, CSR 100 may only be updated when the CE signal is asserted. Deasserting the clock enable signal may prevent internal components in the flip-flops 101 from changing state in response to transitions of the clock signal CLK. Consequentially, the power consumption of the flip-flop may be reduced when the clock enable signal is deasserted. When the clock enable signal is deasserted, the load on the clock signal due to flip-flops 101 may be reduced. Deasserting a CSR's clock enable signal is referred to herein as "gating" the clock signal to that CSR.

Generally, values in a CSR tend to remain static. Thus, the clock enable signal CE may tend to be deasserted except in situations where a value in the CSR is to be updated. A CSR may be updated by either software or hardware in some embodiments.

Figure 1A:
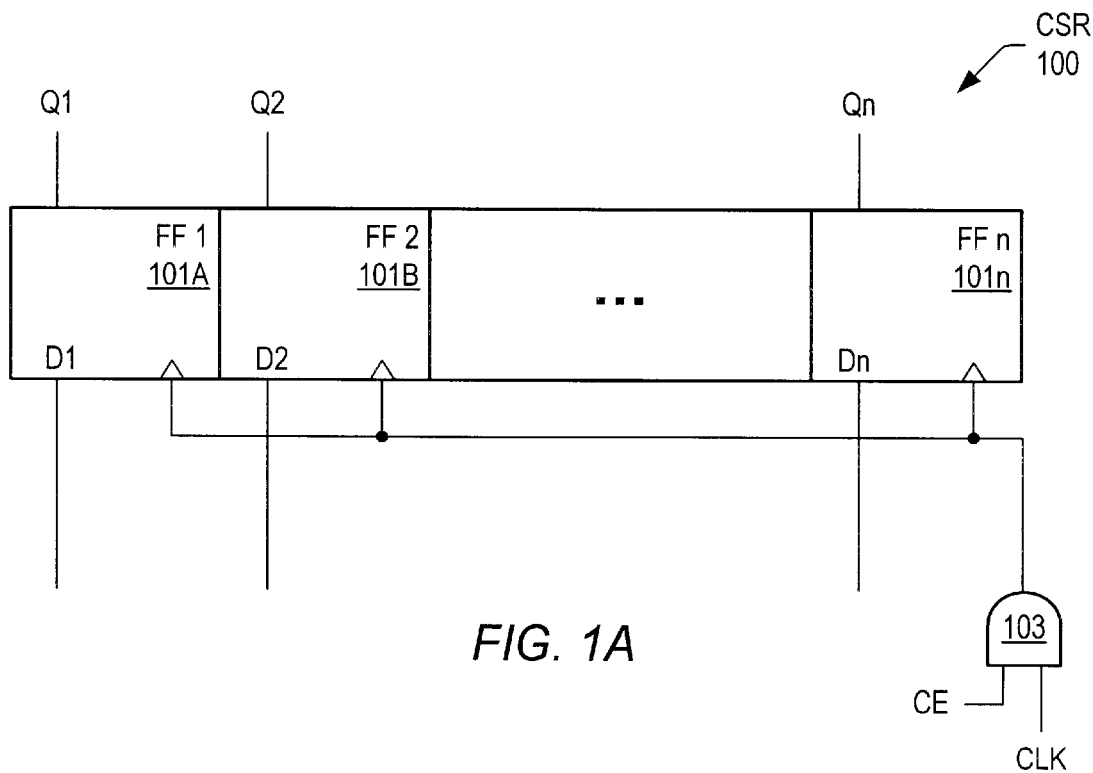
FIG. 1A illustrates another embodiment of a CSR.

FIG. 1A shows an alternative embodiment of a CSR whose clock signal is gated by a clock enable signal. In this embodiment, an external gate 103 is used to control the clock signal provided to the flip-flops 101 so that the clock signal seen by the flip-flops 101 is deasserted unless the clock enable signal is asserted. Note that in another embodiment, a CSR may be configured to receive the gated clock signal from another device (e.g., an embodiment of a clock gating unit similar to the one shown in FIG. 2).

Figure 2:
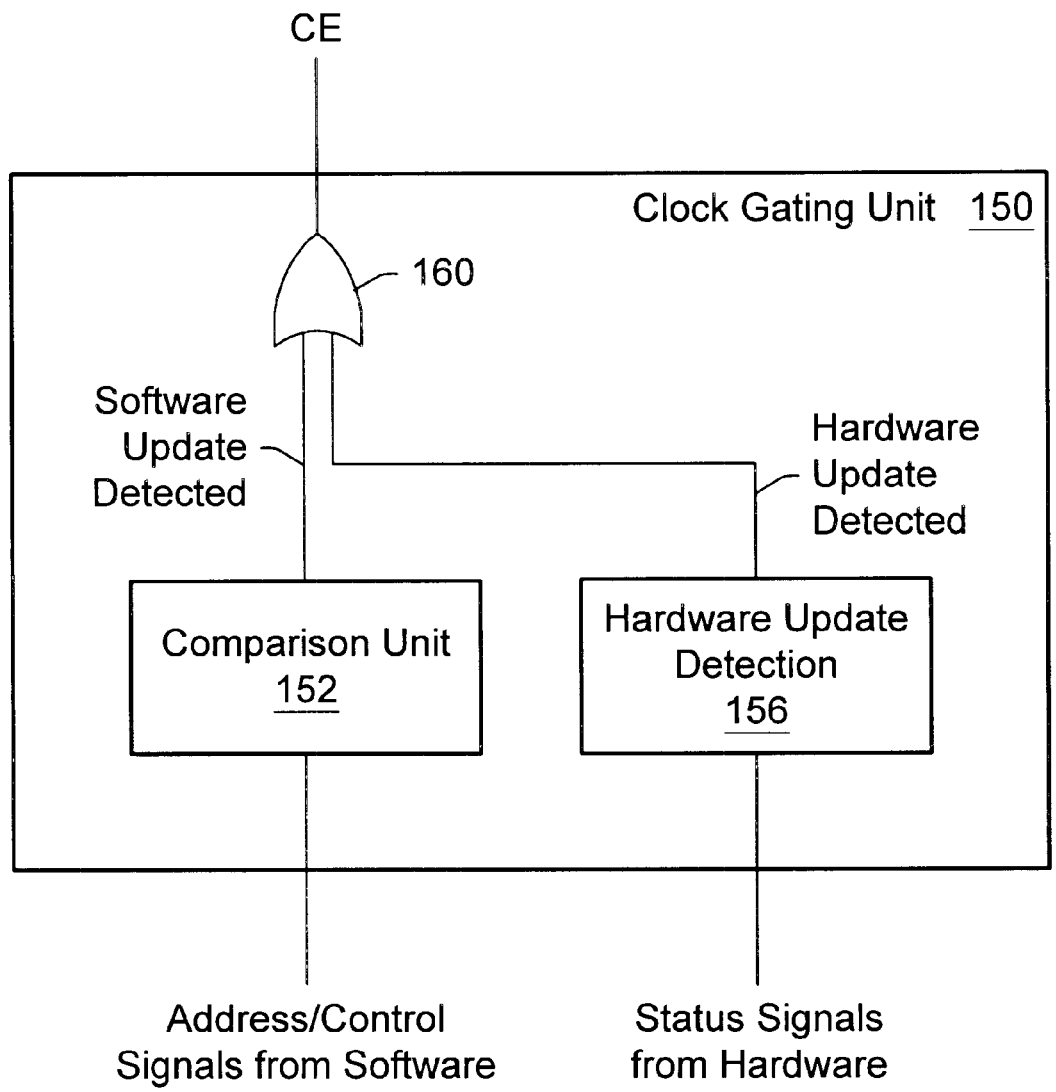
FIG. 2 illustrates one embodiment of a clock gating unit.

FIG. 2 shows one embodiment of a clock gating unit 150 for a particular CSR. In this embodiment, clock gating unit 150 is configured to detect updates to a given CSR from both hardware and software. In this embodiment, the clock gating unit internally generates two signals, Hardware Update Detected and Software Update Detected. Here, the two signals are input to OR logic 160 so that if either type of update is detected, the clock enable signal CE for the CSR is asserted. Clock gating unit 150 includes a comparison unit 152 to detect software updates and a hardware update detection unit 156.

Hardware update detection unit 156 may receive status information from the hardware associated with the CSR. Hardware update detection unit 156 may also receive the output of the CSR (not shown). Based on the current state of the CSR and the value of the status information the hardware, hardware update detection logic 156 controls the value of the Hardware Update Detected signal. For example, in one embodiment, hardware update detection logic 156 may detect hardware updates by comparing the status information currently stored in the CSR to status information currently being generated by the hardware. If the two values are not equal, hardware update detection logic 156 may assert the Hardware Update Detected signal, causing logic 160 (shown as OR logic in this embodiment) to assert the Clock Enable signal for the CSR.

In another embodiment, the hardware update detection logic 156 may detect transitions in the status information output by the hardware associated with the CSR and assert the Hardware Update Detected signal whenever a transition is detected.

The hardware outputting the status information may be configured to output each status information value for a minimum number of clock cycles since the clock gating unit may introduce a delay between the time at which the hardware outputs new status information and the time at which clock enable signal to the CSR is asserted.

Software updates to the CSR may be detected by comparison unit 152. Comparison unit 152 may compare an address present on an address bus to the address of the CSR. If the two addresses match, comparison unit 152 may assert the Software Update Detected signal. In some embodiments, comparison unit 152 may also compare a command (e.g., read, write) to a specific command value in order to determine whether to assert the Software Update Detected signal. For example, in one embodiment, comparison unit 152 may only assert the Software Update Detected signal if a write to the CSR's address is detected. Asserting the Software Update Detected signal asserts the clock enable signal.

Note that in some embodiments, the clock gating unit for a given CSR may detect updates from either software or hardware but not both. For example, if a CSR only stores control information and is not configured to be updated by hardware, the clock gating unit for that CSR may assert and deassert the CE signal based on whether any software updates for that CSR have been detected.

In an alternative embodiment, a clock gating unit 150 may be configured to output a gated clock signal to a respective CSR. Thus, the clock gating unit 150 may include one or more components (e.g., an AND gate) that receive an internally-generated clock enable signal and a clock signal and output a gated clock signal that is then provided to the respective CSR associated with that clock gating unit.

Integrated Circuit (IC)

Figure 3:
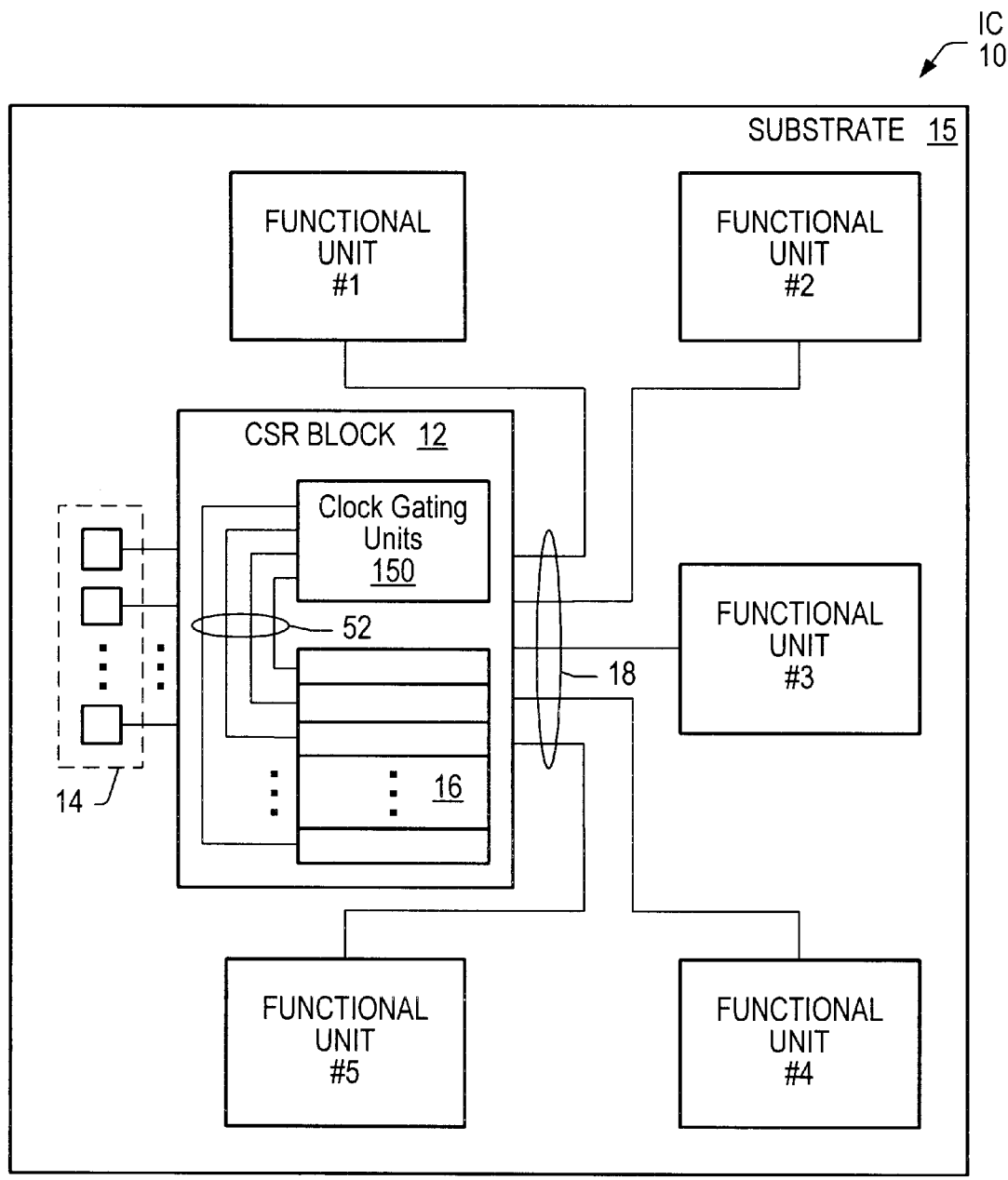
FIG. 3 illustrates one embodiment of an IC.

FIG. 3 is a block diagram of a one embodiment integrated circuit (IC) 10 forming a device and including a centralized control and status register (CSR) block 12. CSR block 12 includes a set of addressable CSRs 16 assigned to the device. IC 10 may include a clock gating unit for one or more of the CSR registers 16. CSR block 12 is coupled to a set of input/output (I/O) pads 14 and to each of five functional units, numbered 1 through 5, dispersed about a surface of a semiconductor substrate 15. Each of the five functional units performs one or more logical functions dependent upon control values stored in control registers of CSR block 12. I/O pads 14 are adapted to receive address, data, and control signals from, for example, signal lines of an external bus coupled to I/O pads 14. When a write command conveyed via the address, data, and control signals includes an address of one of the CSRs 16, CSR block 12 stores the data within the addressed CSR. When a read command conveyed via the address, data, and control signals includes an address of one of the CSRs 16, CSR block 12 drives a data portion of I/O pads 14 with data stored within the addressed CSR.

CSR block 12 may include a CSR clock gating unit 150 like the one shown in FIG. 2 for one or more of CSRs 16. An independent clock enable signal (or, in an alternative embodiment, an independently-gated clock signal) may be provided to each gated CSR 16 from a respective one of the clock gating units. When a command conveyed via the address, data, and control signals is received, each of the clock gating units 150 may compare the address to the address of a respective CSR. If the address matches (and, in some embodiments, if the control signals indicate that the command is a write), a clock gating unit may assert its associated CSR's clock enable signal. Thus, each CSR 16 may be gated independently of the other CSRs. As a result, the power consumption of each gated CSR may be controlled independently.

CSR block 12 distributes control signals stored within control registers of the CSRs 16 to the five functional units via some signal lines of the multiple buses 18, and receives status information to be stored in the status registers of CSRs 16 via other signal lines of the multiple buses 18. In some embodiments, all or some of clock gating units 150 may be configured to control the clock enable signals for their respective CSRs based on whether updated status information is received on buses 18. Note that in some embodiments, fewer than all of the CSRs 16 may be gated by a clock gating unit 150.

Figure 4:
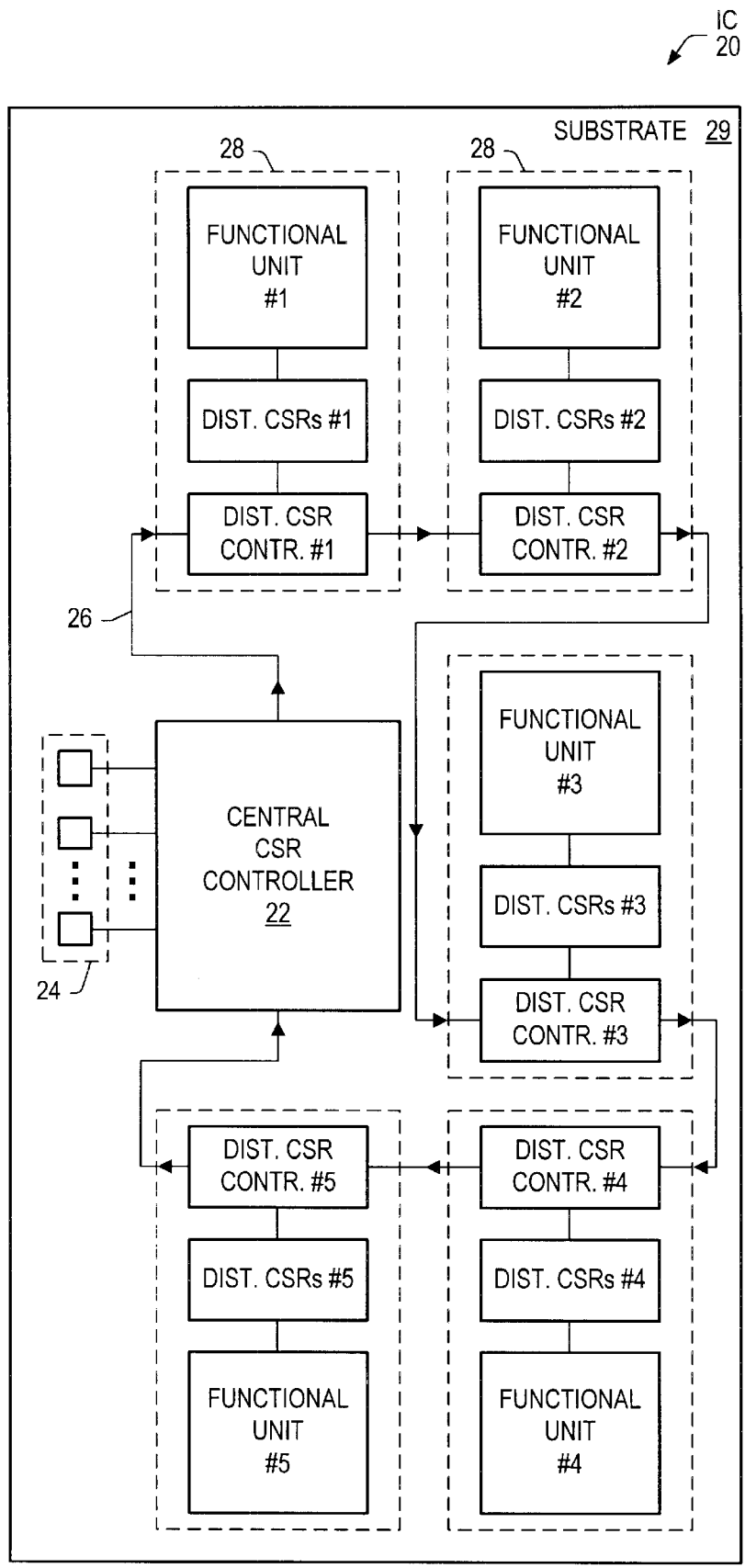
FIG. 4 illustrates another embodiment of an IC.

FIG. 4 is a diagram of an embodiment of an integrated circuit (IC) 20. IC 20 may function within a computer system as a peripheral device controller, or as part of a peripheral device controller. IC 20 includes a central control and status register (CSR) controller 22 coupled to a set of input/output (I/O) pads 24. A single CSR bus 26 couples central CSR controller 22 and multiple logic modules 28 dispersed about a surface of a semiconductor substrate 29 in serial "daisy chain" fashion to form a communication ring. Each logic module 28 includes a set of distributed CSRs coupled between a distributed CSR controller and a functional unit. In the embodiment of FIG. 4, each set of distributed CSRs includes at least one control register, and may include one or more status registers. The functional unit performs one or more logical functions dependent upon a control value stored within the control register. Each distributed CSR controller may include one or more clock gating units 150 that are each configured to generate a clock enable signal for a respective one of the distributed CSRs.

In the embodiment of FIG. 4, CSR bus 26 couples central CSR controller 22 and five logic modules 28 in serial "daisy chain" fashion to form a communication ring. Central CSR controller 22 and logic modules 28 form separate nodes or modules of the communication ring, and data flows in a single direction around the communication ring as indicated in FIG. 4. CSR bus 26 includes multiple sections, each section forming a point-to-point connection between an output port of one module and an input port of another module. Each module receives data from a predecessor or "upstream" module via one section of CSR bus 26 and sends data to a successor or "downstream" module via another section of CSR bus 26.

Each of the five logic modules 28 includes a set of distributed CSRs, labeled "DISTR. CSR #n" where n is an integer between 1 and 5, coupled between a distributed CSR controller labeled "DISTR. CSR CONTR. #n" and a functional unit labeled "FUNCTIONAL UNIT #n." Input and output ports of a distributed CSR controller form the input and output ports of the corresponding logic module 28. Data from the upstream module arrives at the input port of the distributed CSR controller, and the distributed CSR controller sends data to the downstream module by driving the data on CSR bus 26 at the output port.

CSR bus 26 may be a serial data bus upon which signals representing single binary digits (bits) of information are transmitted sequentially. Alternately, CSR bus may be a parallel data bus upon which multiple bits are transmitted simultaneously. In one embodiment, CSR bus 26 is a parallel data bus upon which eight bits are transmitted simultaneously at a clock frequency generated for the functional units of IC 20.

I/O pads 24 may be coupled to terminals of a device package, and are adapted to receive address, data, and control signals (e.g., from signals lines of an external bus coupled to I/O pads 24). When I/O pads 24 are coupled to corresponding signal lines of an external bus, central CSR controller 22 receives address, data, and control signals from the corresponding signals lines of the external bus, and drives address, data, and control signals upon the corresponding signal lines of the external bus. Central CSR controller 22 thus forms an interface between IC 20 and the external bus. It is noted that central CSR controller 22 may be accessed through various specific interfaces, such as a Joint Test Action Group (JTAG) interface.

When received address, data and control signals convey a write command including an address of one of the addressable CSRs of IC 20, central CSR controller 22 issues a write command to a "target" logic module 28 including the addressed CSR via CSR bus 26. The write command includes address signals indicating the target logic module 28 and the addressed CSR, data signals conveying the data to be written into the addressed CSR, and a write command signal.

The distributed CSR controller of the target logic module 28 writes the data conveyed by the write command into to the addressed CSR. Each distributed CSR controller may include one or more clock gating units 150 for one or more distributed CSRs. Each clock gating unit 150 may be configured to detect hardware and software updates (e.g., to a register that stores status information) or software updates (e.g., to a register that stores control information). Thus, when a write command addresses one of the distributed CSRs, the clock gating unit for that CSR may assert that CSR's clock enable signal. Similarly, if a hardware update for a particular CSR is detected by that CSR's clock gating unit, the clock gating unit may assert the clock enable signal for that CSR. Accordingly, the clock to an individual CSR may be gated and ungated independently of the clock to other CSRs in the group of distributed CSRs.

When received address, data, and control signals convey a read command including an address of one of the addressable CSRs of IC 20, central CSR controller 22 issues a read command to a target logic module 28 including the addressed CSR via CSR bus 26. The read command includes address signals indicating the target logic module 28 and the addressed CSR, and a read command signal. The distributed CSR controller of the target logic module 28 responds to the read command by reading the data within the addressed CSR and providing the data to the central CSR controller 22. Central controller 22 may then drive a data portion of I/O pads 24 with data retrieved from the addressed CSR.

Central CSR controller 22 preferably issues write and read commands as packets. As described below, central CSR controller 22 and logic modules 28 may also issue other types of packets. In one embodiment, the packets have a fixed length equal to the maximum CSR width divided by the width of CSR bus 26, and CSR bus 26 operates on a packet time-slot basis.

Each packet includes an address payload, a data payload, and a cyclic redundancy check (CRC) payload for error checking. The address payload conveys information identifying the type of packet, the target module, and the addressed CSR. The data payload conveys CSR data. In one embodiment, the maximum width of a CSR is 64 bits, the width of CSR bus 26 is 8 bits, and the packet data payload is conveyed in 8 cycles of CSR bus 26.

Central CSR controller 22 and each logic module 28 have different module identification (ID) values. A module ID value may be, for example, a number that uniquely identifies a given module. The address payload of a packet includes the module ID of the target module.

When a given module receives a packet, the distributed CSR controller examines the address payload of the packet to determine if the address payload includes the module ID of the module. If the address payload does include the module ID of the receiving module, the packet is not destined for the module, and the distributed CSR controller forwards the packet to the downstream module.

If the address payload includes the module ID of the receiving module, the packet is destined for the module. The distributed CSR controller copies the packet information and forwards the packet to the downstream module. The distributed CSR controller may modify the packet information before forwarding the packet to signal receipt of the packet. The distributed CSR controller performs the command according to the packet type information of the address payload. If the packet conveys a read command, the distributed CSR controller retrieves the data from addressed CSR and sends the data to central CSR controller 22 via the downstream module. In order to aid recognition of the read data by central CSR controller 22, the distributed CSR controller may include the module ID and address information from the original read command packet in the response packet including the read data. The distributed CSR controller may include packet type information which indicates the packet contains read data, append the read data, calculate a CRC value over the address and data payloads, and include the CRC value before sending the response packet including the read data.

Central CSR controller 22 checks the address and data payloads of all received packets for errors using the CRC values and manages CSR error logging and reporting. When a packet returns to a sending module, the sending module removes the packet from the communication ring. The sending module may also check the address and data payloads for errors using the CRC value to make sure the packet completed the round trip without any errors before removing the packet from the communication ring. If the CRC check indicates an error, the sending module may send a packet to central CSR controller 22 indicating the error. (See table 3 below.) It is noted that selected modules may also check all received packets for errors and report any detected errors to central CSR controller 22. In one embodiment, all modules may check all received packets for errors and report any detected errors to central CSR controller 22.

Table 1 below illustrates an exemplary packet format where CSR bus 26 is a parallel data bus conveying eight bits of data as CSR[7–0] simultaneously.

TABLE 1

Exemplary Packet Format For 8-Bit CSR Bus.

| Payload | Portion | CSR[7–0] |
|---|---|---|
| Address | AddrC | COM[7–0] |
|  | AddrM | MOD_ID[m–(m–7)] |
|  | AddrA | ADDR[m–(m–7)] |
| Data |  | DATA[m–(m–7)] |
| CRC |  | CRC[7–0] |

In Table 1 above, the address payload is made up of a command portion (AddrC), a module ID portion (AddrM) and an address portion (AddrA). The 8-bit command (COM) portion conveys a command or packet type, such as a read command or a write command. The module ID ($MOD_{13}$ ID) portion includes the module ID of the target module. The address (ADDR) portion indicates the addressed CSR. The data (DATA) payload normally conveys data read from or written to a CSR. The module ID and address portions of the address payload, and the data payload, may include any number of bits, and thus may require any number of cycles of CSR bus 26. The 8-bit CRC value may be computed over the address and data payloads.

For example, Table 2 below lists the information conveyed upon CSR bus 26 during bus cycles where the module ID is 8 bits long, allowing for up to 256 modules, the address portion is 16 bits, the maximum width of a CSR is 64 bits, and higher-ordered bits are transmitted first.

TABLE 2

Exemplary Bus Cycle Information.

| Bus Cycle | Information Conveyed |
|---|---|
| 1 | COM[7:0] |
| 2 | MOD_ID[7:0] |
| 3 | ADDR[15:8] |
| 4 | ADDR[7:0] |
| 5 | DATA[63:56] |
| 6 | DATA[55:48] |
| 7 | DATA[47:40] |
| 8 | DATA[39:321 |
| 9 | DATA[31:24] |
| 10 | DATA[23:16] |
| 11 | DATA[15:8] |
| 12 | DATA[7:0] |
| 13 | CRC[7:0] |

In Table 2 above, the 8-bit command (AddrC) portion of the address payload is conveyed during the first cycle of CSR bus 26, and the 8-bit module ID (AddrM) portion of the address payload is conveyed during the second cycle. The 16-bit address (AddrA) portion of the address payload is conveyed during the third and fourth cycles of CSR bus 26. The 64-bit data payload is conveyed during bus cycles 5–12, and the 8-bit CRC value is conveyed during bus cycle 13.

Following reset, CSR bus 26 may be driven with all zeros (e.g., '00000000'). A distributed CSR controller may recognize a non-zero value driven upon CSR bus 26 as the start of a first packet.

Table 3 below lists exemplary contents of the command (AddrC) portion of the address payload.

TABLE 3

Exemplary Contents Of The Command (AddrC) Portion Of The Address Payload.

| COM[7:0] | Description |
|---|---|
| 11111111 | CSR bus 26 is free; a distributed CSR controller may insert a packet (e.g., on a packet time slot). |
| 00000001 | CSR write cycle; data will be written to the addressed CSR. The data payload contains the data to be written. |
| 00000010 | CSR read cycle; data will be read from the addressed CSR. (The data payload may, for example, contain all zeros). |
| 00000011 | CSR read cycle; data supplied by distributed CSR controller. |
| 00000100 | Distributed CSR error detected; the data payload contains a time stamp. |
| (All Others) | Reserved. |

Central CSR controller 22 may send a write command packet on every packet timeslot. In one embodiment, central CSR controller 22 allows only a single read command packet to be outstanding in order to simplify the tracking of outstanding read command packets. In other embodiments, central CSR controller 22 may include a tracking mechanism that allows any number of read command packets to be outstanding at any given time.

Figure 5:
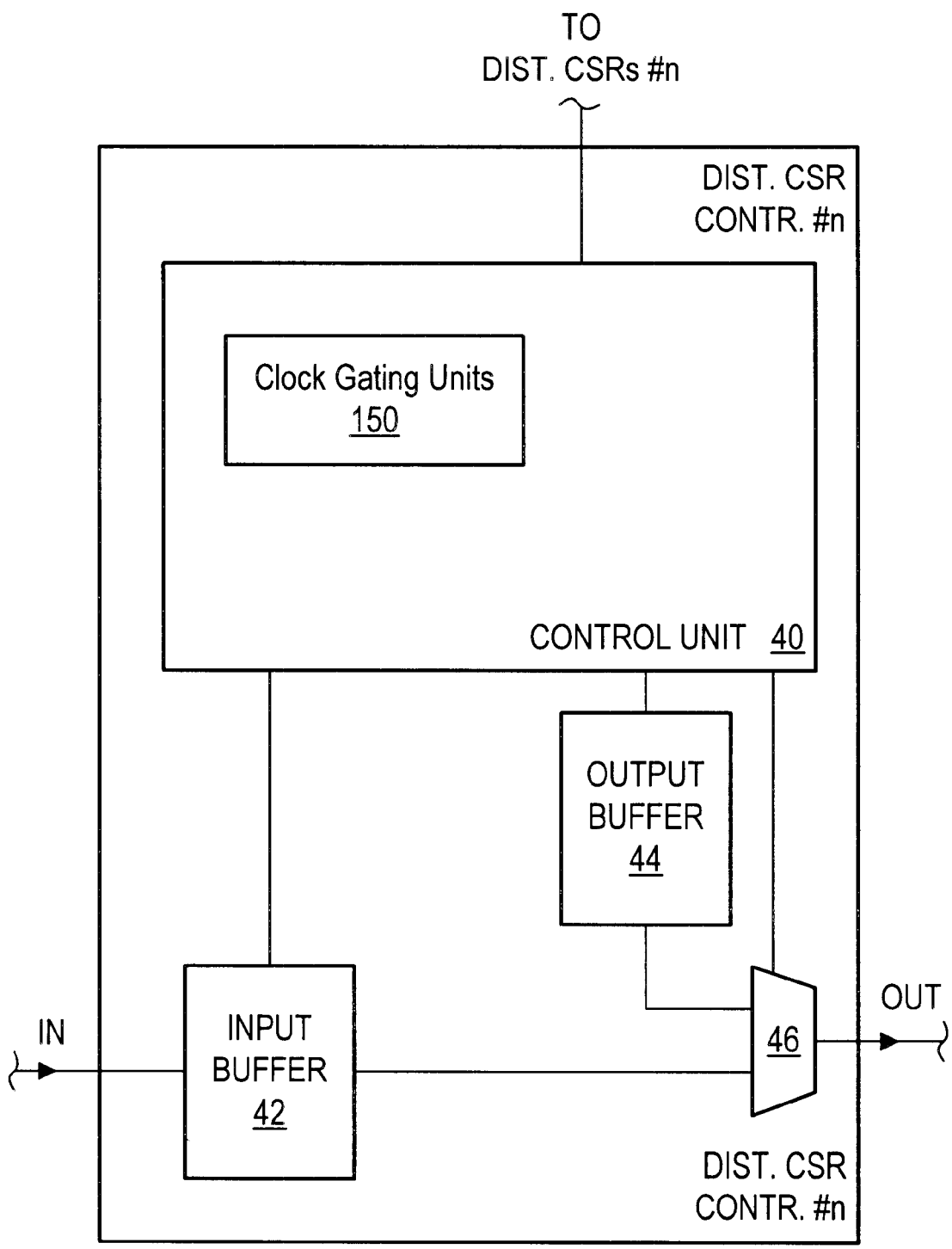
FIG. 5 illustrates one embodiment of a distributed CSR controller.

FIG. 5 is a diagram of one embodiment of a representative one of the distributed CSR controllers of FIG. 4. In the embodiment of FIG. 5, the representative distributed CSR controller (DIST. CSR CONTR. #n) includes a control unit 40 coupled to an input buffer 42, and output buffer 44, and a multiplexer 46. Control unit 40 is also coupled to the corresponding distributed CSRs (DIST. CSRs #n, see FIG. 4). Control unit 40 controls the operations of input buffer 42, output buffer 44, and multiplexer 46. Control unit 40 may also include a clock gating unit for one or more of the distributed CSRs controlled by the distributed CSR controller. As described above, the input port of the distributed CSR controller is coupled to CSR bus 26. Input buffer 42 receives incoming data from the input port and temporarily stores the incoming data.

Control unit 40 examines incoming data stored within input buffer 42 to determine if the data is destined for the corresponding module (e.g., the corresponding distributed CSRs). Where data is packetized as described above, control unit 40 examines the address payload of the received packet to determine if the address payload includes the module ID of the corresponding module. If the address payload does not include the module ID of the receiving module, the packet is not destined for the module. Control unit 40 forwards the packet to the downstream module by sending a control signal to multiplexer 46 that causes multiplexer 46 to produce the packet from input buffer 42 at an output port. The output port of multiplexer 46 is coupled to the output port of the distributed CSR controller.

If the address payload includes the module ID of the receiving module, the packet is destined for the module. Control unit 40 copies the packet information (e.g., into output buffer 44). Control unit 40 forwards the packet to the downstream module by sending a control signal to multiplexer 46 that causes multiplexer 46 to produce the packet from input buffer 42 at the output port. Control unit 40 may modify the packet information before forwarding the packet to signal receipt of the packet. Control unit 40 performs the command according to the packet type (e.g., command) information of the address payload. If the packet conveys a write command, each clock gating unit 150 may compare the destination address of the write to the address of the CSR associated with that clock gating unit. If the addresses equal, a clock gating unit 150 may assert the clock enable signal for its associated CSR. Since the clock enable signal is asserted for the destination CSR, the control unit 40 may then store the write data within the corresponding distributed CSRs.

If the packet conveys a read command, control unit 40 retrieves the requested data from the control or status register of the distributed CSRs identified by the address portion of the address payload. Control unit 40 forms a response packet within output buffer 44 containing the read data. In order to aid recognition of the read data by central CSR controller 22, control unit 40 may include the module ID and address information from the original read command packet in the response packet. Control unit 40 adds packet type information to the response packet that indicates the packet contains read data. Control unit 40 calculates a CRC value over the address and data payloads, and includes the CRC value in the response packet. Control unit 40 sends the response packet to central CSR controller 22 (FIG. 4) via the downstream module.

Control unit 40 may send a packet to central CSR controller 22 via the downstream module by waiting for a start of a packet time-slot, and making sure no packet is being received at input port of the distributed CSR controller. Control unit 40 then issues a control signal to multiplexer 46 that causes multiplexer 46 to produce the packet from output buffer 44 at the output port.

When the response packet is received by input buffer 42 after completing a round trip of CSR bus 26, control unit 40 checks the address and data payloads for errors using the CRC value. If the CRC check indicates an error, control unit 40 sends a packet to central CSR controller 22 indicating the error as described above.

As described above, central CSR controller 22 manages CSR error logging and reporting. As shown in Table 3 above, a CSR distribution error packet has an address payload containing the module ID of the reporting module, and the data payload contains a time stamp. The time stamp may be, for example, the value of a free running counter within the distributed CSR controller when the error was detected. Each distributed CSR controller may include a free running counter receiving the same clock signal. All of the free running counters may all be reset by the distributed CSR controllers at the same time. The free running counter value within error packets allows the central CSR controller to determine which distributed CSR controller detected an error first. Such information may help to determine where a fault exists. The width of the free running counters may be as large as the maximum size of the data payload. In one embodiment, the width of the free running counters is 16 bits, and the higher-order bits of the free running counter values are sent first.

Numerous variations and modifications will become apparent to those skilled in the art once the above disclosure is fully appreciated. It is intended that the following claims be interpreted to embrace all such variations and modifications.

What is claimed is:

1. An integrated circuit comprising:
   a plurality of CSRs (Control and Status Registers), wherein each CSR includes one or more flip-flops;
   one or more clock gates, wherein each clock gate is coupled to provide a gated clock signal to one or more of the flip-flops in a respective one of the CSRs, wherein each clock gate is configured to output a clock signal as the gated clock signal if a clock enable signal that corresponds to the respective CSR is asserted; and one or more clock gating units, wherein each clock gating unit is configured to generate the clock enable signal for the respective one of the plurality of CSRs, wherein a first clock gating unit is configured to assert the clock enable signal for a first one of the CSRs in response to detecting a software update to the first CSR.

2. The integrated circuit of claim 1, wherein each clock gate is integrated into a respective flip-flop, wherein each flip-flop has a clock enable input and a clock signal input.

3. The integrated circuit of claim 1, wherein the first clock gating unit detects the software update to the first CSR by detecting an indication that the first CSR is the destination of a write command.

4. The integrated circuit of claim 3, wherein the indication is an address of the first CSR.

5. The integrated circuit of claim 1, wherein the first clock gating unit is further configured to assert the clock enable signal for the first CSR in response to detecting a hardware update to the first CSR.

6. A method of reducing power consumption of an integrated circuit comprising a plurality of CSRs (Control and Status Registers), the method comprising:

deasserting a first clock enable signal to a first CSR of the plurality of CSRs and a second clock enable signal to a second CSR of the plurality of CSRs;

subsequently detecting a software update to the first CSR;

in response to said detecting, asserting the first clock enable signal associated with the first CSR;

in response to said asserting, providing a clock signal to the first CSR;

wherein the first clock enable signal is asserted independently of the second clock enable signal.

7. The method of claim 6, wherein said detecting comprises detecting a write to an address associated with the first CSR.

8. The method of claim 6, further comprising asserting the first clock enable signal associated with the first CSR in response to detecting a hardware update to the first CSR.

9. An integrated circuit comprising:

a plurality of means for storing control and status information, wherein each of the means for storing control and status information cannot be updated unless a respective clock enable signal is asserted; and one or more means for detecting a software update to a respective one of the means for storing control and status information, wherein each means for detecting the software update controls the respective clock enable signal for the respective one of the means for storing control and status information, wherein each means for detecting the software update asserts the respective clock enable signal in response to detecting a the software update to the respective one of the means for storing control and status information.

* * * * *

UNITED STATES PATENT AND TRADEMARK OFFICE
CERTIFICATE OF CORRECTION

| | |
|---|---|
| PATENT NO. | : 6,636,074 B2 |
| DATED | : October 21, 2003 |
| INVENTOR(S) | : Schulz |

It is certified that error appears in the above-identified patent and that said Letters Patent is hereby corrected as shown below:

<u>Column 12,</u>
Line 27, please cahnge "response to detecting a the" to -- response to detecting the --.

Signed and Sealed this

Sixth Day of July, 2004

JON W. DUDAS
*Acting Director of the United States Patent and Trademark Office*